March 15, 1927. Re. 16,571

R. A. McCANN

RAILWAY TRAFFIC CONTROLLING APPARATUS

Original Filed Feb. 14, 1924

INVENTOR:
R. A. McCann,
by A. R. Terrill
His attorney

Reissued Mar. 15, 1927. Re. 16,571

UNITED STATES PATENT OFFICE.

RONALD A. McCANN, OF SWISSVALE, PENNSYLVANIA, ASSIGNOR TO THE UNION SWITCH & SIGNAL COMPANY, OF SWISSVALE, PENNSYLVANIA, A CORPORATION OF PENNSYLVANIA.

RAILWAY-TRAFFIC-CONTROLLING APPARATUS.

Original No. 1,512,120, dated October 21, 1924, Serial No. 692,682, filed February 14, 1924. Application for reissue filed April 3, 1926. Serial No. 99,656.

My invention relates to railway traffic controlling apparatus and particularly to apparatus of the type wherein governing means on a train are controlled by alternating currents which are supplied to the track rails in accordance with traffic conditions in advance of the train. More specifically my invention relates to apparatus of this type wherein the alternating train governing currents in the track rails are superposed upon direct current track circuits including storage batteries, and wherein rectifying devices supplied from the source of alternating current are provided for the purpose of charging such storage batteries.

One feature of my invention is the provision in apparatus of the type described of means for preventing false indications on a train due to periodic current applied to the track rails by such rectifiers.

Figure 1:
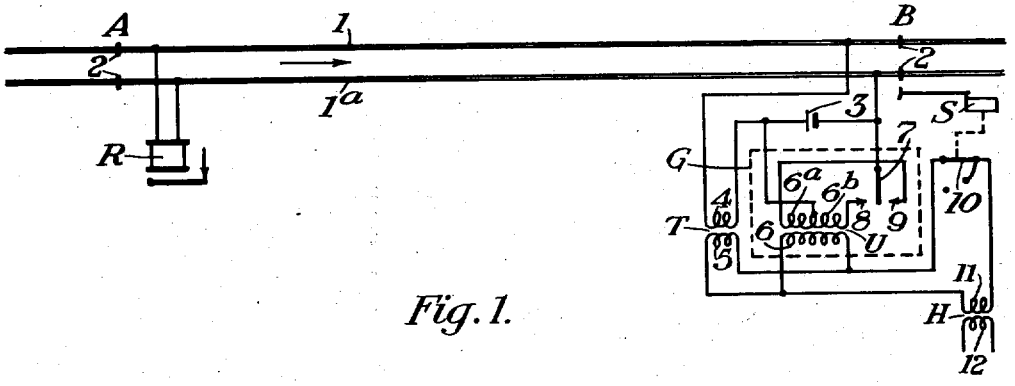
Figure 2:
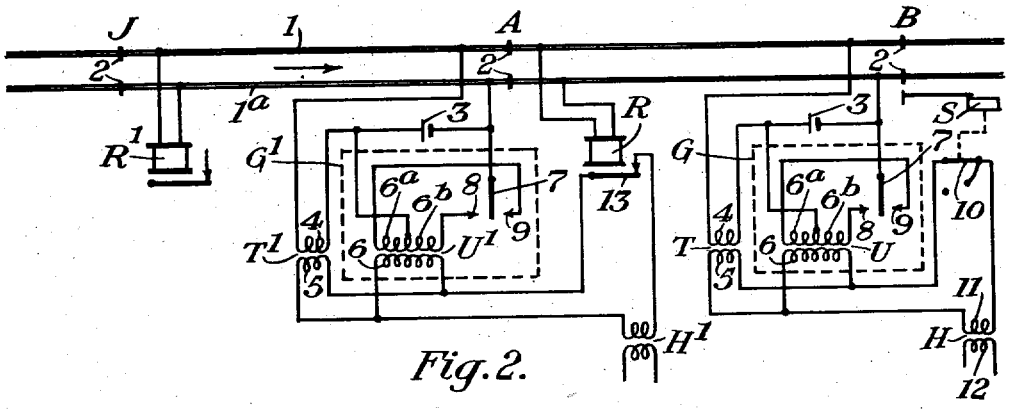
Figure 3:
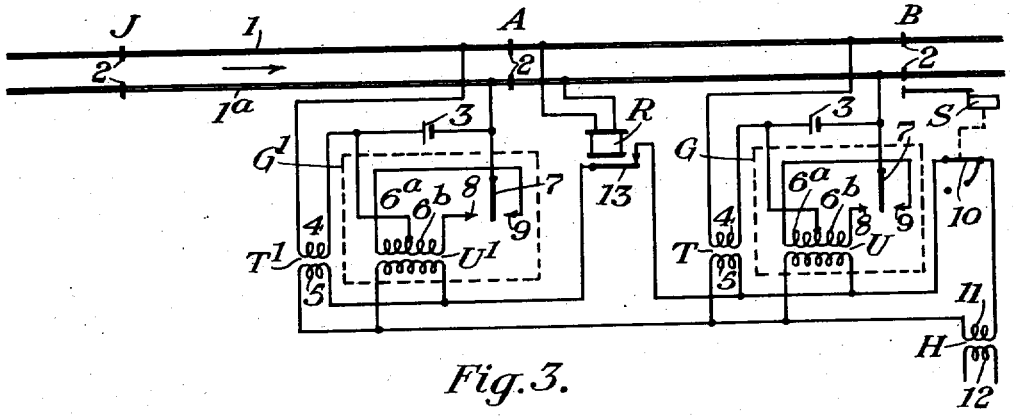

In the accompanying drawing, Fig. 1 is a diagrammatic view showing one form and arrangement of trackway apparatus embodying my invention. Figs. 2 and 3 are views showing modifications of the apparatus illustrated in Fig. 1 and also embodying my invention.

Similar reference characters refer to similar parts in all three views.

Referring first to Fig. 1, the reference characters 1 and $1^a$ designate the track rails of a railroad over which traffic normally moves in the direction of the arrow. These rails are divided, by means of insulated joints 2, into a plurality of successive track sections of which only one section A—B is shown in the drawing.

Located at point B is a trackway signal S of any suitable form. As here shown signal S is a semaphore signal capable of displaying a "Proceed," a "Caution," or a "Stop" indication, controlled in any suitable manner in accordance with traffic conditions in advance.

The reference character T designates a track transformer having a secondary winding 4 connected across the rails adjacent the right hand end of section A—B. Interposed between winding 4 and one rail $1^a$ of section A—B is a track circuit storage battery 3 for the control of a direct current track relay R. When signal S is at proceed or caution alternating current is supplied to primary 5 of transformer T from secondary 11 of transformer H over circuit controller 10 operated by signal S. The primary 12 of transformer H is constantly supplied with alternating current from some suitable source not shown in the drawing. It is therefore clear that section A—B is constantly supplied with direct current, and is also supplied with alternating train governing current when signal S is at proceed or caution.

Battery B is arranged to be charged by a suitable form of rectifier from the alternating current source. As here shown the charger G is a mechanical rectifier of the usual form and comprises a transformer U having its primary winding 6 connected in parallel with primary 5 of track transformer T. A polarized armature 7 is arranged to respond to reversals in the relative polarity of the current in the primary 6 of transformer U, to connect the right hand side of battery B alternately with the right hand and left hand terminals of the secondary of transformer U. To accomplish this result two fixed contacts 8 and 9 co-operate with armature 7 and are connected with the free ends of windings $6^b$ and $6^a$ respectively. The common terminal of windings $6^b$ and $6^a$ is constantly connected with the left hand side of battery 3. The rectifier therefore operates as a "trickle charger" to supply unidirectional current to battery 3.

The trackway apparatus here shown is suitable for co-operation with train carried governing mechanism so that when the train occupies a portion of track which is being supplied with train governing current the train receives a proceed indication, and when the train occupies a stretch of track to which the supply of such current is interrupted, the train receives a stop indication. In at least one form of apparatus arranged to operate in this manner the train carried mechanism is controlled by the train governing current in the rails through the medium of a pick-up coil in inductive relation with the rails.

As shown in the drawing, signal S is at proceed and train governing current is therefore supplied to the rails of section A—B and a train proceeding through this section would therefore receive a proceed indication.

If signal S were at stop the supply of train governing current would be interrupted and the train would then receive a stop indication.

It should be pointed out that with apparatus of this type a portion of the pulsating uni-directional current supplied by charger G will flow in the track rails, and this current might cause a proceed indication to be received on the train in the same manner as the train governing current. In my invention therefore, to prevent the train from receiving a false proceed indication when the signal in advance is at stop, I arrange at such time to discontinue the supply of energy to transformer U.

In the modification shown in Fig. 2, section A—B is provided with apparatus similar to that shown in Fig. 1 and in addition a relay R is connected across the rails adjacent the left hand end of section A—B. Section J—A is provided adjacent its right hand end with apparatus for supplying the rails with alternating and direct current which apparatus is the same as already explained in connection with the apparatus for section A—B, except that energy is supplied to primary 5 of transformer T and the primary 6 of transformer U from a transformer $H^1$ similar to transformer H, over a front contact of relay R instead of circuit controller 10. It follows that direct current is constantly supplied to the rails of both sections and that alternating current is supplied to the rails of section A—B, as before, only when signal S indicates "proceed" or "caution". It will also be clear that section J—A is supplied with alternating current only when relay R is energized. In Fig. 2, the chargers G and $G^1$ are each disconnected from their energy source when the associated train governing transformer is de-energized.

Referring now to Fig. 3, in this modification the apparatus is the same as shown in Fig. 2, except that transformers T, U, $T^1$ and $U^1$ are all supplied with energy from transformer H. It will be clear from the drawing that transformers U and T are energized when signal S indicates proceed or caution whereas transformers $U^1$ and $T^1$ are energized when signal S indicates proceed or caution and relay R is energized. The operation of the apparatus will be obvious without further explanation.

Although I have herein shown and described only a few forms of railway traffic controlling apparatus embodying my invention, it is understood that various changes and modifications may be made therein within the scope of the appended claims without departing from the spirit and scope of my invention.

Having thus described my invention, what I claim is:

1. Railway traffic controlling apparatus comprising a stretch of railway track, a track battery connected with the rails of said stretch, a rectifier for charging said battery, and means responsive to traffic conditions for controlling said rectifier.

2. Railway traffic controlling apparatus comprising a stretch of railway track, a battery connected with the rails of said stretch, a source of alternating current, a rectifier interposed between said battery and said source, and means controlled by traffic conditions for at times disconnecting said source from said rectifier.

3. In combination, a stretch of railway track, means for supplying said stretch with alternating train governing current, a battery connected with the rails of the stretch, a source of alternating current, a rectifier for charging said battery from said source, and means for controlling said first means and the supply of current to said rectifier in accordance with traffic conditions.

4. In combination, a stretch of railway track, a transformer having a secondary connected with the rails of the stretch, a battery also connected with said rails, a rectifier for charging said battery, and means under the control of traffic conditions for at times supplying alternating current to said rectifier and to the primary of said transformer.

5. In combination, a stretch of railway track, a transformer having a first winding connected with the rails of the stretch, a battery also connected with said rails, a rectifier for charging said battery, a trackway signal responsive to traffic conditions, and means controlled by said signal for at times supplying alternating current to said rectifier and to a second winding of said transformer.

6. In combination, a stretch of railway track, a transformer having a first winding connected with the rails of the stretch, a battery also connected with said rails, a rectifier for charging said battery, a track relay connected across the rails in advance of said stretch, and means controlled by said relay for at times supplying alternating current to said rectifier and to a second winding of said transformer.

7. In combination, a stretch of railway track, a track transformer having a winding connected across the rails of the stretch, a battery interposed between said winding and one rail of the stretch, a rectifier for charging said battery, a source of alternating current, and means responsive to traffic conditions in advance of the stretch for at times connecting said source with a second winding on said transformer and with said rectifier.

8. In combination, a stretch of railway track, a track transformer having a winding connected across the rails of the stretch, a battery interposed between said winding and one rail of the stretch, a rectifier for charging said battery, a source of alternating current, means for at times connecting said source with a second winding on said transformer and with said rectifier so that when said second winding is disconnected from said source the flow of periodic current from said source to the rails through the rectifier is prevented.

9. In combination, a stretch of railway track, a track transformer having a winding connected across the rails of said stretch, a battery in series with said winding, an auxiliary transformer having a secondary connected with said battery, a rectifier interposed between said auxiliary transformer and said battery, and means responsive to traffic conditions in advance of said stretch for at times supplying alternating current to the primary winding of said track transformer and to the primary winding of said auxiliary transformer in parallel.

10. In combination, a stretch of railway track divided into a forward section and a rear section, a track transformer having a winding connected across the rails of said forward section, a first battery connected in series with said winding, means responsive to traffic conditions in advance of said forward section for at times supplying alternating current to a second winding on said transformer connected in parallel with said second winding, a relay responsive to current from said battery, a second battery connected with said rear section, charging means for said second battery, and means controlled by said relay for supplying energy to said last charging means.

11. In combination, a stretch of railway track divided into a forward section and a rear section, a track transformer having a winding connected across the rails of said forward section, a first battery connected in series with said winding, a first rectifier for charging said battery, means controlled by traffic conditions in advance of said forward section for at times supplying said winding and said rectifier with alternating current, a second battery connected across the rails, of said rear section, a second rectifier for charging said battery, and means responsive to traffic conditions in said forward section and in advance of said forward section for at times supplying alternating current to said second rectifier.

12. In combination, a section of railway track, a track circuit for said section including a storage battery constantly connected across the rails, a rectifier for charging said storage battery, and means for supplying alternating current to said rectifier and for supplying alternating train governing current to the rails of said section under safe traffic conditions in advance, but for discontinuing the supply of such alternating current to both the rectifier and the track rails under unsafe traffic conditions in advance.

13. In a continuous inductive train control system for railroads, equipped with direct current track circuits and a floating charge system, the combination with the track battery and its charging circuit, of means for interrupting said charging circuit whenever the next block in advance is occupied.

14. A train control system of the character described, having in combination with a track battery and a charging circuit therefor, a circuit controller in said charging circuit opened whenever the next block in advance is occupied.

15. In a train control system for railroads having blocks equipped with direct current track circuits, means for supplying alternating current across the track rails at the exit end of each block in series with the track battery, only if the block next in advance is not occupied, a charging circuit for the track battery including a source of alternating current and a rectifier, and means for interrupting the charging circuit for the track battery of each block if the block next in advance is occupied.

16. In a train control system for railroads, equipped with direct current track circuits, the track batteries of which are maintained charged by a floating charge system, means controlled in accordance with traffic conditions for impressing across the track rails at the exit end of each block a fluctuating voltage, provided the next block in advance is not occupied, and means for preventing the application of such fluctuating voltage from the floating charge system.

17. In a train control system, the combination with a direct current track circuit having a storage battery for the track battery, a source of alternating current connected at times under predetermined traffic conditions in advance across the track rails at the exit end of each block, and means for charging the track battery from said source but preventing the application of a fluctuating voltage from said source under said predetermined traffic conditions.

18. A system of train control of the character described, comprising in combination with direct current track circuits and a floating charge system for the track batteries thereof, means for interrupting the charging of each track battery while the track of the block in advance is occupied.

19. In a train control system, the combination with a direct current track circuit having a storage battery for the track battery connected across the track rails in series with a resistance, a source of alternating current and a rectifier supplying a uni-directional pulsating voltage across said battery and resistance, and automatic traffic controlled means for governing the supply of said pulsating voltage.

20. In a continuous inductive train control system for blocks equipped with direct current track circuits, the combination with a storage battery connected across the track rails at the exit end of each block, of traffic controlled means for charging said storage battery and providing a pulsating inter-rail voltage for train control purposes.

21. A continuous inductive train control system characterized by the use of a storage battery and a charging circuit automatically controlled in accordance with traffic conditions to provide a charging current for the battery and a train control current.

In testimony whereof I affix my signature.

RONALD A. McCANN.